United States Patent Office 3,787,359
Patented Jan. 22, 1974

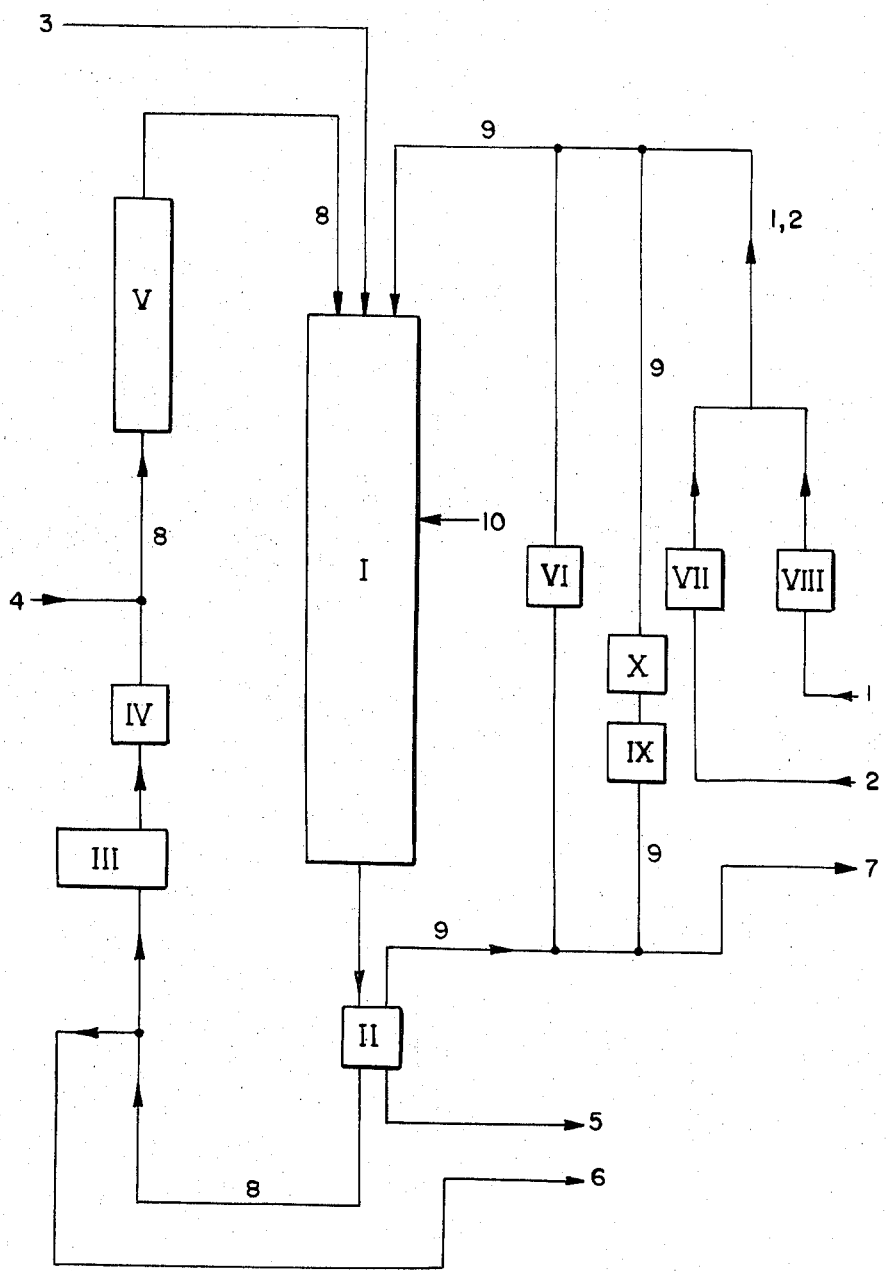

3,787,359
CONTINUOUS MANUFACTURE OF HIGH MOLECULAR WEIGHT LINEAR POLYCARBONATES
Peter Horn and Ludwig Schuster, Ludwigshafen, Georg Falkenstein, Neustadt, and Hans-Ingo Joschek, Mannheim, Germany, assignors to Badische Anilin- & Soda-Fabrik Aktiengesellschaft, Ludwigshafen (Rhine), Germany
Filed Jan. 11, 1972, Ser. No. 216,949
Claims priority, application Germany, Jan. 15, 1971,
P 21 01 700.5
Int. Cl. C08g 17/13
U.S. Cl. 260—47 XA     9 Claims

ABSTRACT OF THE DISCLOSURE

Continuous manufacture of high molecular weight linear polycarbonates of high purity from organic dihydroxy compounds and phosgene in one or more packed reactors, wherein the reaction is carried out under "transition flow" conditions, conveniently with recycling of the reaction mixture.

---

This invention relates to a process for the manufacture of high molecular weight linear polycarbonates of high purity from organic dihydroxy compounds and phosgene by the two-phase interface process, wherein the reaction is carried out under "transition flow" conditions in one or more packed reactors, preferably with recycling of the reaction mixture.

It is known to manufacture valuable high molecular weight linear polycarbonates by reacting aromatic dihydroxy compounds or mixtures of aromatic and cycloaliphatic or aliphatic dihydroxy compounds in the presence of organic monohydroxy compounds acting as chain stoppers in aqueous alkaline solution with phosgene and/or bischlorocarboxylates in inert organic solution by the two-phase interface process with the addition of tertiary amines or salts thereof as catalysts. This process, which is not fully satisfactory industrially, gives polycarbonates which tend to discolor during molding and which show variations in their all-around properties.

It is also known to manufacture polycarbonates continuously from the said starting materials in a number of cascade-connected reactors, for example a cascade of stirred vessels, or in a packed column through which the reactants flow cocurrently under so-called trickling conditions. These processes yield products of constant quality. However, their drawback is that they operate at unsatisfactory space-time yields and involve relatively expensive methods of removing the heat of reaction.

Exothermic reactions which take place between a gas and a liquid in the presence of a fixed-bed catalyst may be carried out by causing the liquid to trickle down through a packed column containing catalyst as packing and causing the gas to flow simultaneously down through the column. In this process, however, the space-time yields obtained are poor. Due to difficulty of heat removal, some hot spots occur, these frequently leading to the formation of by-products and/or damage to the catalyst.

A.I. Ch. E. Journal, vol. 10 (1964), pp. 951–957 states that the following types of flow occur when a gas and a liquid are passed cocurrently through a packed column, the actual state of flow depending on the rates at which the gas and liquid are fed to the column:

(1) Gas continuous flow: The liquid trickles over the packing and gas flows continuously through the voids in the bed. The liquid flows over the packing in the form of a laminar film.
(2) Transition or rippling flow: The liquid passes through the bed in a turbulent state.
(3) Pulsing flow: The pulses traverse the column in the form of plugs of relatively high-density material at a specific frequency.

It is an object of the invention to provide a process for producing high molecular weight linear polycarbonates of high purity in a simple manner and with high space-time yields.

This object is achieved in a continuous process for the manufacture of high molecular weight linear polycarbonates by reacting organic dihydroxy compounds in the presence of organic monohydroxy compounds acting as chain stoppers in aqueous alkaline solution with phosgene in inert organic solution by the two-phase interface process with the addition of amines or salts thereof, wherein the reaction is carried out under transition flow conditions involving a liquid aqueous phase, a liquid organic phase and a phosgene-containing gas phase flowing cocurrently through one or more packed reactors, the rate of flow of the liquids being from 30 to 300 m.$^3$/m.$^2$/hr. and that of the gases from 10 to 3,000 m.$^3$/m.$^2$/hr., and the reaction mixture leaving the final reactor is separated into a gas phase and a liquid phase, the reaction product being isolated from the latter.

In our new process, an intimate mixture of gas and liquid flows through the bed. For this reason, the polycarbonates are obtained from the phosgene and the dissolved other starting materials in much higher space-time yields than in the prior art continuous manufacturing processes involving, say, a conventional cascade of stirred vessels. The heat of reaction, which is known to be difficult to remove and is usually controlled by precooling the individual streams of reactants, may be readily removed in the present process without the occurrence of hot spots. This avoids the formation of by-products having a detrimental effect on the all-round properties of the polymers and there are obtained high molecular weight linear polycarbonates of high purity.

The preparation of the polycarbonates by the process of the invention is effected using the usual dihydroxy compounds, as disclosed for example in German Pat. 1,300,266. Suitable dihydroxy compounds have the formula HO—R—OH, where R stands for a divalent aliphatic or cycloaliphatic radial of from 2 to 12 carbon atoms and preferably from 2 to 6 carbon atoms or a divalent aromatic radical consisting of one or more aromatic nuclei of from 6 to 18 carbon atoms, which nuclei are attached to each other by a direct bond or, in some cases, by divalent bridging groups such as —S—, —SO$_2$—, —O—, —CO—, —CH$_2$—,

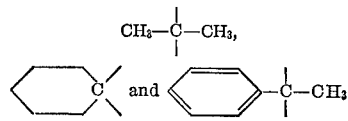

The dihydroxy compounds may be used alone or as mixtures.

Specific examples of said aliphatic or cycloaliphatic compounds are ethylene glycol, propanediol-1,3, butanediol-1,3, butanediol-1,4, hexanediol-1,6, decanediol-1,10, cyclohexanediol-1,2, cyclohexanediol-1,4 and 2,6-dihydroxydecahydronaphthalene. Specific examples of suitable aromatic compounds are hydroquinone, resorcinol, pyrocatechol, 1,2-, 1,4- and 1,5-dihydroxynaphthalenes, 4,4'-dihydroxydiphenyl, 2,2'-dihydroxydiphenyl, 4,4' - dihydroxydiphenylsulfide, 4,4'-dihydroxydiphenyl sulfoxide, 2,2'- and 4,4'-dihydroxydiphenylsulfones, 4,4'-dihydroxydiphenylether, 4,4'-dihydroxybenzophenone, 1,1-(4,4'-dihydroxydiphenyl) - 1 - phenylethane and 1,1-(4,4'-dihydroxydiphenyl)cyclohexane. The preferred compounds, however, are 4,4'-dihydroxydiphenylmethane and 2,2-(4,4'-dihydroxydiphenyl)propane.

The other starting reactant is phosgene. The gaseous phosgene may be used as such or diluted with inert gases such as nitrogen, helium and carbon monoxide. However, it is preferred to use commercial phosgene having a carbon monoxide content of approximately 2 to 15% and preferably 7 to 12%, by volume of the total volume of the gas mixture.

Suitable chain stoppers are organic monohydroxy compounds. Specific examples thereof are phenol, the cresols, p-isopropylphenol, p-tert.-butylphenol and p-chlorophenol.

The organic bases used are alkali metal hydroxides, preferably sodium or potassium hydroxide.

Suitable inert organic solvents are chlorine-containing aliphatic compounds having from 1 to 3 carbon atoms such as methylene chloride, chloroform, ethylene chloride and propylene chloride and unsubstituted or substituted aromatic compounds of from 6 to 8 carbons such as benzene, toluene, xylene and chlorobenzene. The solvents may be used alone or as mixtures. The amount of solvent used is conveniently such that the ratio of the liquid aqueous phase to the liquid organic phase is from 1:0.5 to 1:2 and preferably from 1:0.8 to 1:1.2 and is in particular about 1:1, by volume, whilst the reaction mixture has a solids content of from 2 to 20% and preferably from 4 to 15% and more preferably from 8 to 12%, by weight of the total weight of the reaction mixture.

Examples of suitable amines are tertiary amines such as trimethylamine, triethylamine, tripropylamine, tributylamine, N,N-dimethylcyclohexylamine, N,N-diethylcyclohexylamine, N,N-dimethylaniline, pyridine, picoline, quinoline, N-alkylmorpholines or salts thereof.

The process of the invention for the preparation of linear high molecular weight polycarbonates of high purity is advantageously carried out under transition flow conditions in one or more packed reactors, for example two cascade-connected reactors.

The reactors, which are generally in the form of columns, may have any cross-section, for example a square or elliptical cross-section. However, we prefer to use long cylindrical reactors. The ratio of internal diameter to length of the reactor is generally from 1:2 to 1:100 and preferably from 1:10 to 1:40. The reactors may be set up vertically or horizontally or tilted. It is preferred, however, to use vertical reactors.

The reactors contain packings consisting of, say, spheres, rings, cylinders or tablets. Where spheres are used, these generally have a diameter of from 2 to 8 mm. Cylindrical packing elements generally have a length of from 2 to 15 mm. and a diameter of from 2 to 6 mm. Non-spherical or non-cylindrical packing elements generally have a volume equivalent to that of cylindrical elements.

It is an essential feature of our novel process that the gaseous phase consisting of phosgene and, optionally, inert gas and the liquid aqueous and liquid organic phases containing, in addition to the organic dihydroxide compounds, other ingredients including monohydroxy compounds as chain stoppers and amines as catalysts pass through the packing in the reactor under transition flow conditions. It is also possible, if desired, to dissolve the amine catalyst in the aqueous phase and feed it to the reaction mixture in this form. Transition flow conditions are obtained when the liquid loading is between 30 and 300 and preferably between 40 and 200 and more preferably between 50 and 100 m.$^3$/m.$^2$/hr. and the gas rate is between 10 and 3,000 and preferably between 150 and 2,500 and more particularly between 200 and 2,300 m.$^3$/m.$^2$/hr. It will be appreciated that the above limits vary slightly with variations in the viscosity of the reaction solution, the limits in the case of highly viscous reaction solutions being shifted to lower values. In general, a suitable rate is achieved when the liquid fed to the top of the cylindrical reactor no longer flows freely through the packing in the reactor but begins to dam up at the inlet. The gas rate may be selected so that the gas metered to the inlet is completely consumed as it flows through the bed of packing or that excess gas, which may be inert, escapes at the other end of the reactor. The transition flow conditions may be established visually, e.g. by the method described in A.I. Ch. E. Journal, vol. 10 (1964) pp. 952–953.

When conventional column-type reactors are used, complete conversion is not generally achieved in a single pass of the reaction mixture. For this reason, the reaction mixture, once it has passed through the reactor, is reseparated into liquid and gas phases by means of a gas separator. This makes it possible to circulate both phases together or independently of each other. Where conversion is incomplete, the reaction mixture is conveniently recycled to the packed column a number of times, for example from 2 to 40 times. The amount of recycled reaction mixture may be from 5 to 99% and preferably from 10 to 60% and more preferably from 15 to 40%, by weight of the total mixture passed through the reactor.

The amount of reaction mixture recycled is governed by the reaction rate and the amount of heat of reaction to be removed. It is possible, by way of the recycled reaction mixture, to keep the temperature in the reaction zone within narrow limits and thus prevent the occurrence of hot spots which have a detrimental effect on the all-round properties of the polycarbonates. By narrow temperature limits we mean, in general, a range of temperature variation of ±10° C. and preferably of ±5° C. For the above reasons, the reaction is preferably carried out with recycling of a portion of the reaction mixture.

However, complete or substantially complete conversion may in fact be achieved in a single pass, particularly when very long and narrow reactors are used, for example vessels having an l./d. ratio of from 50:1 to 100:1.

One method of carrying out the process, for example, is to circulate the reaction mixture through the packed reactor, the starting materials being added to the circulated reaction mixture before it re-enters the reactor, whilst the product is removed from the reaction mixture, after it has left the reactor, at some point in the circuit upstream of the point at which fresh starting materials are added.

Alternatively, the continuous process may be carried out by causing the reaction mixture to pass through a number of cascade-connected "circulating reactors," for example through two to five such units.

Specifically, the linear high molecular weight polycarbonates are advantageously manufactured by reacting the organic dihydroxy compounds in the form of aqueous alkaline solutions containing from 900 to 1,100 g./liter and preferably from 920 to 980 g./liter of said compounds and from 1.2 to 1.8 and preferably from 1.4 to 1.6 moles of alkali per mole of dihydroxy compound, with phosgene diluted with inert gas in a ratio by volume of from 1:1 to 1:0.01 and preferably from 1:0.5 to 1:0.1 in inert organic solution in a molar ratio of from 1:0.9 to 1:1.5 and preferably from 1:1 to 1:1.3 and more preferably from 1:1.1 to 1:1.2 by the two-phase interface process using from 0.001 to 0.2 and preferably from 0.001 to 0.01 mole of organic monohydroxy compound as chain stopper per mole of dihydroxy compound and from 0.001 to 0.1 and preferably from 0.01 to 0.05 mole of a tertiary amine or salt thereof per mole of dihydroxy compound at reaction temperatures ranging from 0° to 100° C. and preferably from 20° to 60° C.

A preferred embodiment of the process of the invention is illustrated by the accompanying drawing, in which the reference numerals have the following meanings:

| I | Reactor. |
|---|---|
| II | Gas separator. |
| III | Circulating pump. |
| IV | Flow meter for the recycled liquid phase. |
| V | Cooler. |
| VI | Differential manometer. |
| VII | Flow meter for the inert gas. |
| VIII | Flow meter for the phosgene. |
| IX | Circulating pump. |
| X | Flow meter for the recycled gas phase. |
| 1 | Fresh phosgene line. |
| 2 | Fresh inert gas line. |
| 3 | Feed line for the solution of organic dihydroxy and monohydroxy compounds. |
| 4 | Feed line for the amine solution. |
| 5, 6 | Discharge lines for the reaction product. |
| 7 | Off-gas line. |
| 8 | Liquid phasee cycle. |
| 9 | Gas phase cycle. |
| 10 | Inlet valve. |

Phosgene is passed to the top of reactor I through lines 1, 1, 2 and 9 and flow meter 8 and inert gas is fed to reactor I through line 2 and 9 and flow meter VII. An aqueous alkaline solution containing the organic dihydroxy compound and, in minor quantities, monohydroxy compounds in solution is fed to the top of reactor I through line 3. The materials flow through packed reactor I cocurrently under transition flow conditions. The reaction mixture leaves the reactor I at the bottom. The gaseous components of the reaction mixture, the so-called gas phase, are then separated from the reaction mixture in separator II. The liquid reaction mixture is removed from separator II and recycled to the top of reactor I through ring line 8 and circulating pump III, flow meter IV and cooler V. The inert organic solvent and the amine are fed to the liquid phase cycle 8 through line 4. A portion of the liquid reaction mixture leaving separator II is removed through discharge line 5 or 6 and the polycarbonate product is isolated therefrom. The gas phase consisting of inert gas and, possibly, excess phosgene is also recycled through ring line 9 and circulating pump IX and flow meter X. If desired, off-gas may be removed through off-gas line 7. The pressure differential between the gas fed to the reactor and the gas leaving the reactor is measured by manometer VI.

The thus prepared polycarbonate-containing reaction mixture which has a viscosity at 25° C. of from 50 to 1,000 centipoise and preferably from 100 to 800 centipoise at a solids content of from 5 to 10% by weight based on the total weight of the reaction mixture, is worked up by conventional purifying methods.

For example, purification may be carried out in a second cylindrical packed reactor, such as a packed column. To this end, the polycarbonate-containing reaction mixture is fed, together with a mixture of hydrogen chloride and inert gas, advantageously to the top of a packed column at such rates that the excess alkali metal hydroxide and the alkali metal carbonate or bicarbonate formed are converted to alkali metal chlorides on passing through the packing. The aqueous electrolyte-containing solution and the polycarbonate solution are then separated by suitable separating means, for example a liquid centrifuge, the polycarbonate solution then being washed free of electrolyte, for example with condensed water, and then further isolated in one or more separators.

The polycarbonates produced by the process of the invention may be molded, for example, by thermoplastic methods such as injection molding. Examples of applications for the polycondensates are the manufacture of safety glass, crash helmets, insulators for electrical purposes, household articles, panels, sheeting, fibers and films.

The process of the invention is further illustrated with reference to the following examples. The K values given were measured by the method described by H. Fikenstcher in "Cellulosechemie," 13, 58 (1932).

EXAMPLE 1

The reaction was carried out using a packed column I of glass having a length of 2 ml. and an internal diameter of 35 mm. (cf. FIG. 1). The column contained spheres having a diameter of 5 mm. and was filled with 1,000 ml. of a mixture of equal parts by volume of methylene chloride and water, or with reaction mixture from a previous reaction. A solution consisting of 3,000 ml./hr. of methylene chloride and 0.228 g./hr. of triethylamine was then passed through feed line 4 and a solution of 1,400 ml./hr. of 7.9% aqueous caustic soda, 228 g./hr. of 2,2-(4,4'-dihydroxydiphenyl)propane and 0.57 g./hr. of t-butylphenol was passed through feed line 3, whilst 27,000 ml./hr. of phosgene were fed through lines 9 and 1 and 1, 2 through flow meter VIII and 20,000 ml./hr. of nitrogen were passed through line 2 and flow meter VII. After passing through the packed column, the reaction mixture was separated into gaseous and liquid phases in separator II. 150,000 ml./hr. of liquid reaction mixture were removed from the separator and recycled through line 8 and circulating pump III, flow meter IV and cooler V. The nitrogen leaving separator II and possibly containing phosgene was passed through line 9, circulating pump IX and flow meter X at a rate of 1,000 ml./hr. The pressure differential between the gas fed to reactor I and gas leaving reactor I was measured by differential manometer VI and was found to be 0.58 atm. The reaction temperature in the column was 25°±2° C. 19,000 ml. of recycle gas were removed through off-gas line 7 per hour. From separator II or liquid phase cycle 8 there were removed from the reaction mixture 3,000 ml./hr. as reaction product through line 5 or 6.

The reaction product was worked up using a liquid centrifuge to separate the organic and aqueous phases from each other, the organic phase then being washed with water until free from electrolyte. 600 ml. of methanol were then added to each 1,000 ml. of organic phase to precipitate 254 g./hr. of polycarbonate. The colorless polycarbonate was dried at 110° C./0.1 mm. and had a K value of 58 (measured in 0.5% solution in methylene chloride at 25° C.). Conversion, based on 2,2-(4,4'-dihydroxydiphenyl)propane, was 100%.

Injection-molded specimens showed a notched impact resistance of 50 cm. kg./cm.$^2$.

EXAMPLE 2

The reaction was carried out in a manner similar to that described in Example 1 except that two cascade-connected circulating reactors were used and the triethylamine-containing methylene chloride solution fed to the apparatus in Example 1 (through line 4) was omitted and replaced by a solution of 1,000 ml./hr. of methylene chloride and 0.228 g./hr. of triethylamine which was fed to the second circulating reactor only. There was thus obtained a polycarbonate having a K value of 36 on leaving the first reactor and a K value of 56 on leaving the second reactor (as measured in 0.5% w./w. solution in methylene chloride at 25° C.).

EXAMPLE 3

The reaction was carried out using a packed column I of glass having a length of 4 m. and an internal diameter of 36 mm. The packing consisted of glass spheres having a diameter of 5 mm. The apparatus was filled with 3,500 ml. of aqueous methylene chloride (ratio of methylene chloride to water=1:1 by volume). A solution of 22,300 ml./hr. of 6% aqueous caustic soda solution, 2,740 g./hr. of 2,2-(4,4'-dihydroxydiphenyl)propane, 6.85 g./hr. of t-butylphenol and 6.85 g./hr. of sodium sulfite was then passed through feed line 3, a solution of 25,000 ml./hr. of methylene chloride and 54.5 g./hr. of triethylamine was fed through feed line 4 and 324,000 ml./hr. of phosgene were passed through lines 9 and 1, 2 and flow meter VIII and 30,000 ml./hr. of nitrogen were passed through line 2 and flow meter VII. After the reaction mixture had passed through reactor I under transition flow conditions, it was separated into a gas phase and a liquid reaction mixture in separator II. 192,000 ml./hr. of the liquid reaction mixture were removed from separator II and circulated through line 8, circulating pump III, flow meter IV and cooler V. The separated nitrogen, which may contain phosgene, was circulated at a rate of 1,000 ml./hr. from separator II through line 9, circulating pump IX and flow meter X. The pressure differential between the gas fed to reactor I and the gas leaving reactor I was measured by manometer VI and found to be 1.5 atm. 29,000 ml./hr. of off-gas were removed from the cycle via line 7. 25,000 ml./hr. of reaction product were removed from the reaction mixture from separator II or ring line 8 through line 5 or 6. The reaction temperature in the column was 30° C. The reaction product was worked up in a manner similar to that described in Example 1. 600 ml. of methanol were added to each 1,000 of organic phase to precipitate 3,100 g. of polycarbonate. Conversion, based on 2,2-(4,4'-dihydroxydiphenyl)propane, was 100%. The polycarbonate had a K value of 55 (as measured in 0.5% w./w. solution in methylene chloride at 25° C.) and a notched impact resistance of 50 cm. kg./cm.$^2$.

EXAMPLE 4

The reaction was carried out in an apparatus similar to that described in Example 3.

A solution of 22,300 ml./hr. of 6% w./w. aqueous sodium hydroxide solution, 2,740 g./hr. of 2,2-(4,4'-dihydroxydiphenyl)propane, 6.85 g./hr. of t-butylphenol and 6.85 g./hr. of sodium sulfite was passed to the top of reactor I through line 3, 21,500 ml./hr. of methylene chloride were passed through line 4, 324,000 ml./hr. of phosgene were fed through lines 9 and 1, 2, and 30,000 ml./hr. of nitrogen were fed through line 2. The catalyst solution consisting of 3,500 ml./hr. of methylene chloride and 89.2 g./hr. of triethylamine was added to the reaction mixture via an inlet valve 10 located 1.5 m. below the feed line 3. After passing through the reactor I, the reaction mixture was separated into a gas phase and a liquid reaction mixture in separator II, 10,000 ml./hr. of said liquid reaction mixture and 1,000 ml./hr. of nitrogen, possibly containing phosgene, were circulated over the different routes.

The pressure differential between gas inlet and gas outlet of reactor I was 0.6 atm. 29,000 ml./hr. of off-gas were removed from the circulation via line 7. 25,000 ml./hr. of reaction product were removed from the reaction mixture via an overflow from separator II. The reaction temperature in the column was 36°±2° C. Conversion, based on 2,2-(4,4'-dihydroxydiphenyl)propane, was 100%. The polycarbonate had a K value of 61 (as measured in 0.5% w./w. solution in methylene chloride at 25° C.) and a notched impact resistance of 54 cm. kg./cm.$^2$.

EXAMPLE 5

The reaction was carried out in an apparatus similar to that described in Example 4.

A solution of 22,300 ml./hr. of 6% w./w. aqueous caustic soda, 2,740 g./hr. of 2,2-(4,4'-dihydroxydiphenyl)propane, 6.85 g./hr. of t-butylphenol and 6.85 g./hr. of sodium sulfite was fed to the top of reactor I through feed line 3, 15,000 ml./hr. of ethylene chloride were fed through line 4, 324,000 ml./hr. of phosgene were fed through lines 9 and 1, 2, and 30,000 ml./hr. of nitrogen were introduced through line 2. The catalyst solution consisting of 10,000 ml./hr. of ethylene chloride and 54.5 g./hr. of triethylamine was added to the reaction mixture via an inlet valve 10 located 1.5 m. below feed line 3. After passing through reactor I, the reaction mixture was separated into a gas phase and liquid reaction mixture in separator II. 120,000 ml./hr. of the liquid reaction mixture and 1,000 ml./hr. of nitrogen, possibly containing phosgene, were recycled over the different routes. The pressure differential between the gas inlet and the gas outlet of reactor I was 0.9 atm. 29,000 ml./hr. of off-gas were removed from the circulated gas via line 7. 25,000 ml./hr. of reaction product were removed from the reaction mixture via an overflow from separator II. The reaction temperature in the column was 35° C. Conversion, based on 2,2-(4,4' - dihydroxyldiphenyl)propane, was 100%. The polycarbonate had a K value of 73 (as measured in 0.5% w./w. solution in methylene chloride at 25° C.) and a notched impact resistance of 61 cm. kg./cm.$^2$.

EXAMPLE 6

The reaction was carried out in a packed column I of glass having a length of 4 m. and an internal diameter of 46 mm. The packing material consisted of glass spheres having a diameter of 5 mm. A solution of 22,300 ml./hr. of 6% w./w. aqueous soda, 2,740 g./hr. of 2,2-(4,4'-dihydroxydiphenyl)propane and 2.74 g./hr. of sodium sulfite was fed to the top of reactor I through line 3. A solution of 25,000 ml./hr. of methylene chloride and 16.2 g./hr. of t-butylphenol was fed through line 4 and 380,000 ml./hr. of phosgene were introduced through lines 9 and 1, 2, whilst 30,000 ml./hr. of carbon monoxide were fed through line 2. The catalyst solution consisting of 5,000 ml./hr. of distilled water and 40.9 ml./hr. of triethylamine was added to the reaction mixture via an inlet valve 10 located 0.5 m. below feed line 3. After passing through reactor I, the reaction mixture was separated into a gas phase and a liquid reaction mixture in separator II. 38,600 ml./hr. of said liquid reaction mixture was recycled. The pressure differential between gas inlet and gas outlet of reactor I was 0.6 atm. The reaction temperature in the column was 31°±1° C. Conversion, based on 2,2-(4,4' - dihydroxydiphenyl)propane, was 100%. The polycarbonate had a K value of 62 (as measured in 0.5% w./w. solution in methylene chloride at 25° C.) and a notched impact resistance of 52 cm. kg./cm.$^2$.

EXAMPLE 7

The reaction was carried in an apparatus similar to that described in Example 1.

A solution of 22,300 ml./hr. of 6% w./w. aqueous caustic soda solution, 2,740 g./hr. of 2,2-(4.4'-dihydroxydiphenyl)propane, 2.74 g./hr. of sodium sulfite and 74.4 ml./hr. of triethylamine was fed to the top of reactor I through line 3, whilst a solution of 25,000 ml./hr. of methylene chloride and 1.62 g./hr. of t-butylphenol was introduced through line 4, 380,000 ml./hr. of phosgene through lines 9 and 1, 2, and 30,000 ml./hr. of nitrogen through line 2. After passing through reactor I, the reaction mixture was separated into a gas phase and a liquid reaction mixture in separator II. 38,600 ml./hr. of said liquid reaction mixture were recycled. The pressure differential between gas inlet and gas outlet of reactor I was 0.85 atm. The reaction temperature in the column was 28° C. Conversion, based on 2,2-(4,4'-dihydroxydiphenyl)propane, was 100%. The polycarbonate had a K value of 53 and a notched impact resistance of 40 cm. kg./cm.$^2$.

EXAMPLE 8

The reaction was carried out in a circulating apparatus similar to that described in Example 1 except that the glass column had an internal diameter of 30 mm.

A solution of 22,300 ml./hr. of 6% w./w. aqueous caustic soda solution, 2,740 g./hr. of 2,2-(4.4'-dihydroxydiphenyl)propane and 2.74 g./hr. of sodium sulfite was fed to the top of reactor I through line 3, whilst a solution of 25,000 ml./hr. of methylene chloride and diphenyl in a ratio of 70:30 by volume and 8.02 g./hr. of t-butylphenol was introduced trhough line 4, 380,000 ml./hr. of phosgene through lines 9 and 1, 2, and 30,000 ml./hr. of nitrogen through line 2. The catalyst solution consisting of 10,000 ml./hr. of distilled water and 55.8 ml./hr. of triethylamine was added to the reaction mixture via an inlet valve 10 located 0.5 m. below feed line 3. After passing through the reactor I, the reaction mixture was separated into a gas phase and a liquid reaction mixture in separator II. 12,000 ml./hr. of said liquid reaction mixture were recycled. The pressure differential between gas inlet and gas outlet of reactor I was 0.8 atm. The reaction temperature was 35° C., conversion, based on 2,2-(4,4'-dihydroxydiphenyl)propane, being 100%. The polycarbonate had a K value of 54 and a notched impact resistance of 38.

EXAMPLE 9

The reaction was carried out in an apparatus similar to that described in Example 3.

A solution of 8,460 ml./hr. of 6% w./w. aqueous caustic soda solution, 1,370 g./hr. of 2,2-(4,4'-dihydroxydiphenyl)propane and 1.37 g./hr. of sodium sulfite was fed to the top of reactor I through line 3, whilst a solution of 12,500 ml./hr. of methylene chloride and 4.01 g./hr. of t-butylphenol was introduced through line 4, 141,000 ml./hr. of phosgene through lines 9 and 1, 2, and 30,000 ml./hr. of nitrogen through line 2. The catalyst solution consisting of 5,000 ml./hr. of distilled water and 37.2 ml./hr. of triethylamine was added to the reaction mixture via an inlet valve 10 situated 0.5 m. below feed line 3. After passing through reactor I, the reaction mixture was separated into a gas phase and a liquid reaction mixture in separator II. 38,600 ml./hr. of said liquid reaction mixture were recycled. The pressure differential was 0.85 atm. The reaction temperature was 30° C. Conversion, based on 2,2-(4,4'-dihydroxydiphenyl)propane, was 100%. The polycarbonate had a K value of 54 and a notched impact resistance of 38.

We claim:

1. A continuous process for the production of high molecular weight linear polycarbonates from
   (a) an aqueous alkaline solution of an aromatic dihydroxy compound and a monohydric phenol as chain stopper,
   (b) an inert organic solvent capable of dissolving the resulting polycarbonate,
   (c) phosgene and
   (d) a catalyst selected from the group consisting of trialkylamines and hydrohalides thereof, which comprises reacting the components by interfacial polycondensation under transition flow conditions involving a liquid aqueous phase, a liquid organic phase and a gas phase containing phosgene introduced at the top of and flowing cocurrently through at least one column reactor containing inert packing, the rate of flow of the liquid phases together being from 30 to 300 m.$^3$/m.$^2$/hr. and that of the gas phase being from 10 to 3,000 m.$^3$/m.$^2$/hr., recycling to the top of the column reactor 5–99% of the reaction mixture after it has passed through the final column, separating the liquid from the gas phase and isolating the polycarbonate from the liquid phase.

2. A continuous process as claimed in claim 1, wherein the ratio of the liquid aqueous phase to the liquid organic phase is from about 1:0.5 to 1:2 by volume.

3. A continuous process as claimed in claim 1, wherein the gas phase containing unreacted phosgene is recycled to the reactor.

4. A continuous process as claimed in claim 1, wherein recycling of the liquid and gas phases is effected over different routes.

5. A process for the production of high molecular weight linear polycarbonates which comprises introducing at the top of a packed reaction column
   (a) an aqueous alkaline solution of 4,4'-dihydroxydiphenylmethane or 2,2-(4,4'-dihydroxydiphenyl)propane and, as a chain stopper, a monohydric phenol,
   (b) methylene chloride, chloroform, ethylene chloride or propylene chloride as an inert solvent capable of dissolving the resultant polycarbonate,
   (c) phosgene diluted with inert gas in a ratio by volume of 1:1 to 1:0.01 and
   (d) a tertiary amine catalyst, passing components (a) through (d) cocurrently downwardly through the packing in the column in turbulent flow in the transition state of the liquid aqueous phase and the liquid organic phase at 20–60° C., the rate of flow of the liquid phases together being from 30 to 300 m.$^3$/m.$^2$/hr. and that of the gas phase being from 10 to 3,000 m.$^3$/m.$^2$/hr., recycling to the top of said column 5–99% of the reaction mixture after it has passed through the column, separating the liquid from the gas phase and isolating the polycarbonate from the liquid phase.

6. A process as claimed in claim 5 wherein the ratio of the liquid aqueous phase to the liquid organic phase is from about 1:0.5 to 1:2 by volume.

7. A process as claimed in claim 5, the liquid flow in the transition state being such that liquid fed to the top of the reactor no longer flows freely through the packing in the reactor but begins to dam up at the inlet.

8. A process as claimed in claim 1, the liquid flow in the transition state being such that liquid fed to the top of the reactor no longer flows freely through the packing in the reactor but begins to dam up at the inlet.

9. A process as claimed in claim 5 wherein the alkaline solution (a) contains 1.2 to 1.8 mols of alkali metal hydroxide per mol of said dihydroxy compound.

References Cited
UNITED STATES PATENTS

| | | | |
|---|---|---|---|
| 3,133,044 | 5/1964 | Allen et al. | 260—47 |
| 3,275,601 | 9/1966 | Schnell et al. | 260—47 |
| 3,530,094 | 9/1970 | Schnell et al. | 260—47 |
| 3,674,740 | 7/1972 | Vernaleken et al. | 260—47 |

WILBERT J. BRIGGS, Sr., Primary Examiner

U.S. Cl. X.R.

23—252, 284; 260—49, 95 C

UNITED STATES PATENT OFFICE
CERTIFICATE OF CORRECTION

Patent No. 3,787,359          Dated January 11, 1974

Inventor(s) Peter Horn et al.

It is certified that error appears in the above-identified patent and that said Letters Patent are hereby corrected as shown below:

Column 6, line 12, "Fikenst" should read -- Fikents --.

Column 8, line 30, "46" should read -- 36 --.

Signed and sealed this 8th day of October 1974.

(SEAL)
Attest:

McCOY M. GIBSON JR.
Attesting Officer

C. MARSHALL DANN
Commissioner of Patents